D. F. DEPPE.
COTTON PLANTER.
APPLICATION FILED OCT. 28, 1908.
928,949.
Patented July 27, 1909.
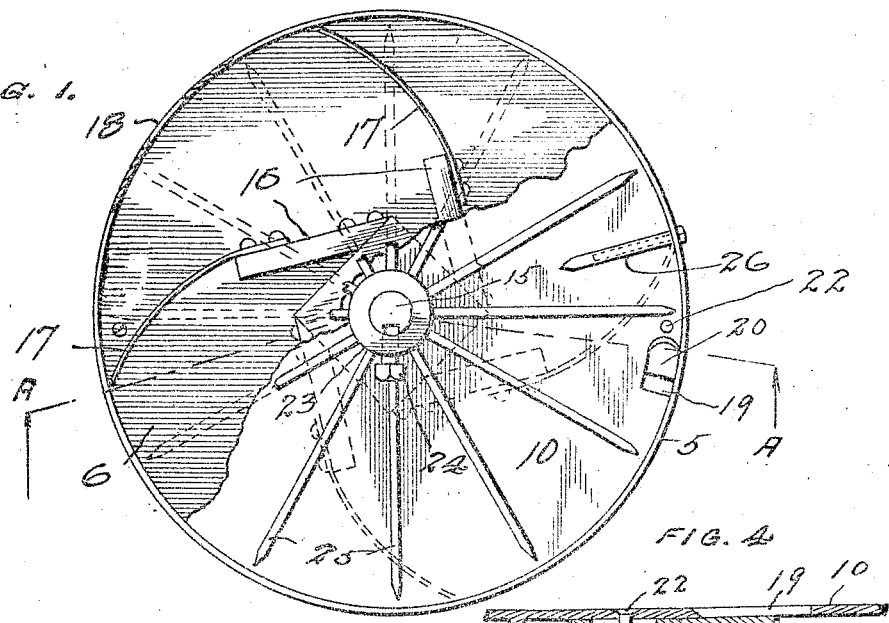
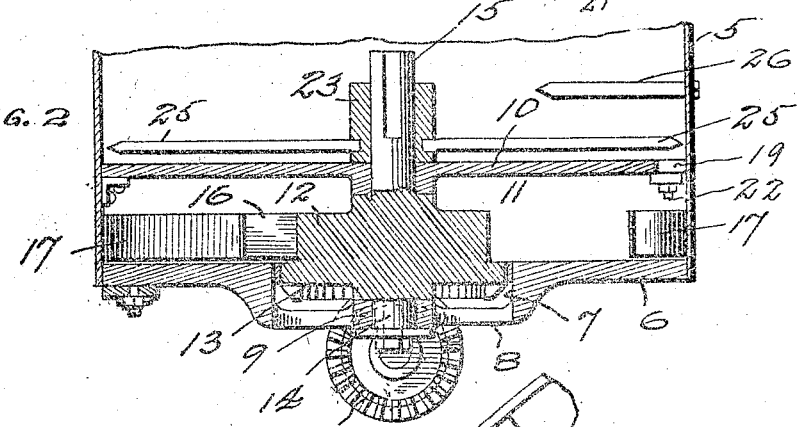
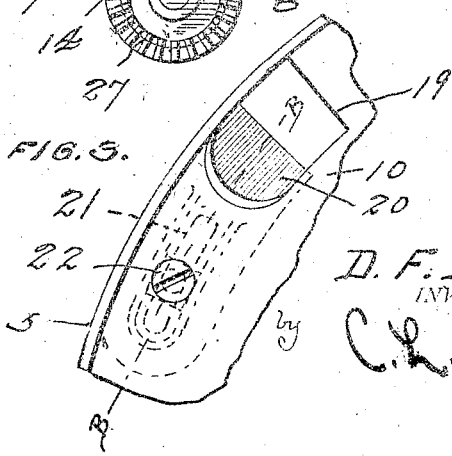
WITNESSES
D. F. Deppe
INVENTOR

UNITED STATES PATENT OFFICE.

DENNIS F. DEPPE, OF NEWBERN, NORTH CAROLINA.

COTTON-PLANTER.

No. 928,949.　　　Specification of Letters Patent.　　　Patented July 27, 1909.

Application filed October 28, 1908. Serial No. 459,900.

*To all whom it may concern:*

Be it known that I, DENNIS F. DEPPE, a citizen of the United States, residing at Newbern, in the county of Craven and State of North Carolina, have invented certain new and useful Improvements in Cotton-Planters, of which the following is a specification.

This invention relates to certain improvements in cotton or other seed planters, and one of the primary objects is to provide novel, simple and effective means for loosening up and separating the seed prior to its being fed to the delivery mechanism.

Another object is to provide simple means for varying the amount of seed fed, and a third important object is to so construct the mechanism that the number of parts is reduced to a minimum.

The preferred embodiment of the invention is illustrated in the accompanying drawings, and is described in the following specification.

It will be evident from the appended claims, that the invention is not limited solely to the details disclosed.

In said drawings, Figure 1 is a top plan view of the feeding means for a planter. Fig. 2 is a sectional view substantially on the line A—A of Fig. 1. Fig. 3 is a detail plan view of the means for varying the feed. Fig. 4 is a detail sectional view on the line B—B of Fig. 3.

In the embodiment of the invention disclosed, a receptacle for the cotton or other seed is designated 5, and is preferably cylindrical, though the shape is unimportant. This receptacle has a bottom 6, provided with a central circular opening 7, carrying a web or spider 8, that is provided with a central journal box 9. A partition 10 extends across the receptacle 5, above the bottom, forming a chamber 11. Located in this chamber is a hub 12, the lower portion of which is formed into a pinion 13. The said hub and pinion are provided with a depending gudgeon 14, and an upstanding gudgeon 15, the former being journaled in the box 9, the latter projecting through and above the partition 10. It is to be noted, that in this structure, the hub 12, the pinion 13, and the gudgeons 14 and 15 are formed of a single piece. The hub is provided with arms 16, carrying spring blades 17, that sweep over the bottom 6 and deliver the seed fed into the chamber 11 out through a peripheral opening 18. The seed is fed into said chamber 11 through an opening 19, formed in the partition 10. The size of said opening it can be varied by means of a slide plate 20, arranged against the under side of the partition 10, and having a slot 21 through which passes a holding bolt 22, said bolt thus constituting means for securing the slide in different adjusted positions.

An agitator rotates over partition 10, and preferably consists of a hub 23, located upon the projecting end of the gudgeon 15, and held against relative rotation thereof by means of a set screw 24. This hub is provided with a series of radially disposed arms 25, that sweep over the upper face of the partition. In order to loosen up and separate the seed, that is rotated by the arms 25, a stationary agitator finger 26 is located just above the path of movement of the arms 25. This finger is secured at its outer end in the wall of the receptacle, and projects inwardly toward the center thereof.

The operation of the device will be clearly evident. The rotary member with the parts carried thereby, being driven by any suitable means, as for instance, a gear 27 in mesh with the pinion 13, will cause the rotation of the arms 25, thus rotating in the receptacle, the body of seed which coming into contact with the stationary finger 26, will be separated so that a certain amount of seed will drop through the opening 19, into the chamber 11. The amount of seed feed is of course, controlled by the slide 20, which can be adjusted as desired. The seed received in the chamber 11, is moved outwardly by the spring arms 17, and delivered through the opening 18. In this structure, the proper feed of seed is insured, because of the finger 26. Such feed can be regulated to the desired quantity and inasmuch as the pinion, hub and shaft are of a single piece, it will be evident that the structure is very simple.

Having fully described my invention, I claim:

1. The combination with a receptacle for the seed having a bottom and a partition arranged above the bottom, of a pinion, a spider and an upstanding gudgeon journaled between the bottom and partition, and formed from a single piece, the gudgeon projecting above the partition, a yielding delivery arm secured to the spider and operating between the bottom and the partition, and a rotary agitator secured to the upper end of the gudgeon and operating over the partition.

2. The combination with a receptacle, having a bottom and a partition located above the bottom, forming a chamber between the two, a spider rotatably located in the chamber and having an integral upstanding gudgeon projecting through and above the partition, yielding arms secured to the spider and operating in the chamber, a rotary agitator secured to the gudgeon and operating over the partition, a stationary agitator finger secured to one wall of the receptacle, and projecting into said receptacle above the agitator, said partition having a feed opening therethrough, and a slide operating across the feed opening to vary the size of said opening.

In testimony whereof I affix my signature in presence of two witnesses.

DENNIS F. DEPPE.

Witnesses:
B. CONNEREIS,
W. J. ABBOTT.